United States Patent
Onomatsu

(10) Patent No.: US 7,525,603 B2
(45) Date of Patent: Apr. 28, 2009

(54) TELEVISION TUNER FOR CONTROLLING DIRECTIVITY OF AN ANTENNA

(75) Inventor: Takehiro Onomatsu, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 653 days.

(21) Appl. No.: 11/141,714

(22) Filed: Jun. 1, 2005

(65) Prior Publication Data
US 2006/0080712 A1  Apr. 13, 2006

(30) Foreign Application Priority Data
Jun. 2, 2004  (JP) .............. 2004-164836

(51) Int. Cl.
*H04N 5/50* (2006.01)
(52) U.S. Cl. .............. 348/732; 348/731; 348/570
(58) Field of Classification Search ............. 348/570, 348/725, 726, 180, 192, 731, 732; 725/72; 342/371, 372; 343/735, 818, 838; 455/161.3, 455/184.1, 185.1, 186.1, 226.1–226.4, 277.2
See application file for complete search history.

(56) References Cited

U.S. PATENT DOCUMENTS

| | | | | |
|---|---|---|---|---|
| 4,349,840 A | * | 9/1982 | Henderson | 348/731 |
| 6,134,426 A | * | 10/2000 | Volkel | 455/161.3 |
| 6,198,925 B1 | * | 3/2001 | Lee | 455/434 |
| 6,334,218 B1 | * | 12/2001 | Jeong et al. | 725/72 |
| 6,985,190 B1 | * | 1/2006 | Klopfenstein et al. | 348/569 |
| 7,006,040 B2 | * | 2/2006 | Henderson et al. | 342/372 |
| 7,380,263 B2 | * | 5/2008 | Shintani | 725/59 |
| 2002/0036718 A1 | * | 3/2002 | Lee | 348/731 |
| 2003/0228857 A1 | * | 12/2003 | Maeki | 455/278.1 |
| 2005/0136857 A1 | * | 6/2005 | Yamamoto et al. | 455/101 |

FOREIGN PATENT DOCUMENTS

JP  11-298226  10/1999

* cited by examiner

*Primary Examiner*—Victor R Kostak
(74) *Attorney, Agent, or Firm*—Yokoi & Co., USA., Inc.; Peter Ganjian

(57) ABSTRACT

Disclosed is a television tuner which receives television signals using a smart antenna. It includes an auto-scan unit which makes a channel storing section store receiving channel numbers and receiving directions for a plurality of receiving channels automatically. It also has a channel change unit whereby a receiving direction in which the state of a signal from a tuner section becomes a predetermined one is not stored. When a command to change channels is given, the smart antenna directivity is changed while the signal state is detected, and when the signal state becomes a predetermined one, the smart antenna directivity is retained. This increases the auto-scan processing speed.

3 Claims, 9 Drawing Sheets

FIG. 5

| Channel number | Frequency band (MHz) |
|---|---|
| 2 | 90~96 |
| 5 | 108~114 |
| 7 | 126~132 |
| 9 | 168~174 |
| 10 | 174~180 |
| 12 | 192~198 |
| 14 | 210~216 |
| 18 | 240~246 |
| 20 | 258~264 |
| ⋮ | ⋮ |
| 69 | 312~318 |

TELEVISION TUNER FOR CONTROLLING DIRECTIVITY OF AN ANTENNA

BACKGROUND OF THE INVENTION

1. Field of the Invention

The present invention relates to a television tuner which receives television signals using a smart antenna.

2. Description of the Prior Art

In television broadcasting, each broadcaster may use different transmitting points. In this case, for a television signal to be received at a receiving point, a receiver must be set so as to receive a desired channel signal and the directivity of the antenna must be adjusted to the transmitting point side of the receiving channel.

A receiver having a smart antenna whose directivity can be statically varied by an electrical signal has been known where the directivity of the smart antenna is automatically varied to all directions to search for a direction in which the state of a received television signal is good (for example, see JP-A No.298226/1999).

Recently, the present inventor has proposed a television tuner which uses a smart antenna as mentioned above to receive television signals where the smart antenna is controlled to change receiving channels as appropriate as follows: the smart antenna directivity is varied to different directions, the receiving condition in each direction is detected and channels on which the receiving condition is good and the corresponding smart antenna receiving directions are correlated to each other and stored in sequence. This type of television tuner is convenient because such smart antenna receiving directions are automatically stored for all receiving channels when an auto scan is performed to set channels for receiving television signals.

However, the above television tuner has the following problem: each time the state of a received signal is good on a receiving channel, the corresponding receiving direction of the smart antenna is stored, so it takes too much time to perform scanning for all receiving channels. Particularly when there are many receiving channels on which signals can be received, this problem is so serious that the user may feel irritated or uncomfortable.

SUMMARY OF THE INVENTION

The present invention addresses the above circumstances and aims to provide a television tuner which can increase the auto scan processing speed.

In order to achieve the object, according to one aspect of the present invention, a television tuner which receives television signals using a smart antenna whose directivity can be statically selected by an electrical signal, includes:

a directivity control section which outputs an electrical signal to select the directivity of the smart antenna;

a tuner section which receives television signals in a given frequency band using the smart antenna;

a signal condition detector section which detects the state of a signal from the tuner section by detecting AGC voltage which determines the gain of a signal from the tuner section and/or a bit error rate of a digital signal from the tuner section;

a channel storing section which stores both the number of a receiving channel on which the state of the signal detected by the signal condition detector section becomes a predetermined one, and the corresponding receiving direction of the smart antenna in a way to correlate them to each other; and an auto-scan unit which makes the channel storing section store receiving channel numbers and receiving directions for a plurality of receiving channels automatically.

In the aspect, the auto-scan unit makes the directivity control section change the directivity of the smart antenna to different directions, makes the signal condition detector section detect a signal state in each direction, and changes receiving channels of the tuner section upon storage of a receiving channel in the channel storing section.

In the aspect, the auto-scan unit does not make the channel storing section store the receiving direction of the smart antenna in which the state of the signal detected by the signal condition detector section becomes a predetermined one.

In the aspect, the tuner further includes a channel change unit whereby, when a command to change receiving channels is given during reception of television signals, the frequency band of a television signal received by the tuner section is set to a frequency band appropriate to the updated channel number and also the antenna control section changes the smart antenna directivity to different directions, the signal condition detector section detects the signal state in each direction, and when the state of the signal detected by the signal condition detector section becomes a predetermined one, the directivity of the smart antenna is retained.

In the aspect configured as above, the signal condition detector section preferably detects a signal state of a signal extracted by the tuner section. The channel storing section stores both the number of a receiving channel on which the state of the signal detected by the signal condition detector section becomes a predetermined one, and the corresponding receiving direction of the smart antenna in a way to correlate them to each other. The auto-scan unit makes the channel storing section store channel numbers for a plurality of channels automatically.

In the aspect, the auto-scan unit preferably makes the channel storing section store only the number of a receiving channel on which the state of the signal detected by the signal condition detector section becomes a predetermined one and not store the corresponding receiving direction of the smart antenna. Consequently, since no receiving direction is stored for each receiving channel, the speed of auto-scan processing is increased.

In the aspect, the auto-scan unit preferably changes receiving channels of the tuner section upon storage of a receiving channel in the channel storing section. In other words, the auto-scan unit makes the signal condition detector section detect a signal state in each direction on one receiving channel and when a detected signal state is a predetermined signal state, no further signal state detection on the same channel is made and the channel is changed to a next receiving channel. Consequently, the speed of auto-scan processing is further increased.

Further in the aspect, when a command to change channels is given during reception of television signals, the channel change unit sets the frequency band of a television signal received by the tuner section to a frequency band appropriate to the updated channel number, and also makes the antenna control section change the smart antenna directivity to different directions, makes the signal condition detector section detect the signal state in each direction, and when the state of the signal detected by the signal condition detector section becomes a predetermined one, retains the directivity of the smart antenna. In other words, each time when a command to change receiving channels is received from the user through a remote control, the directivity of the smart antenna is varied to search for a receiving direction of the smart antenna in which the signal state is good. Consequently, the image quality is stable in television broadcasting.

According to another aspect of the invention, a television tuner which receives television signals using a smart antenna whose directivity can be statically selected by an electrical signal, includes:

a directivity control section which outputs an electrical signal to select the directivity of the smart antenna;

a tuner section which receives television signals in a given frequency band using the smart antenna;

a signal condition detector section which detects the state of a signal from the tuner section;

a channel storing section which stores both the number of a channel on which the state of the signal detected by the signal condition detector section becomes a predetermined one, and the corresponding receiving direction of the smart antenna in a way to correlate them to each other; and an auto-scan unit which makes the channel storing section store channel numbers and receiving directions for a plurality of channels automatically.

Here, the auto-scan unit does not make the channel storing section store the receiving direction of the smart antenna in which the state of the signal detected by the signal condition detector section becomes a predetermined one.

Further, the tuner further includes a channel change unit whereby, when a command to change receiving channels is given during reception of television signals, the frequency band of a television signal received by the tuner section is set to a frequency band appropriate to the updated channel number and also the antenna control section changes the smart antenna directivity to different directions, the signal condition detector section detects the signal state in each direction, and when the state of the signal detected by the signal condition detector section becomes a predetermined one, the directivity of the smart antenna is retained.

In the aspect configured as above, the signal condition detector section detects the state of a signal extracted by the tuner section; the channel storing section stores both the number of a receiving channel on which the state of the signal detected by the signal condition detector section becomes a predetermined one, and the corresponding receiving direction of the smart antenna in a way to correlate them to each other. The auto-scan unit makes the channel storing section store receiving channel numbers for a plurality of receiving channels automatically.

In a preferable configuration, although the auto-scan unit makes the channel storing section store the number of a channel on which the state of the signal detected by the signal condition detector section becomes a predetermined one, it does not make the memory store the corresponding receiving direction of the smart antenna. Since no receiving direction is stored for each receiving channel, the auto-scan processing speed is increased.

In another preferable configuration, when a command to change channels is given during reception of television signals, the channel change unit sets the frequency band of a television signal received by the tuner section to a frequency band appropriate to the updated channel number and also makes the antenna control section change the smart antenna directivity to different directions, makes the signal condition detector section detect the signal state in each direction, and when the state of the signal detected by the signal condition detector section becomes a predetermined one, retains the directivity of the smart antenna. In other words, each time when a command to change receiving channels is received from the user through a remote control, the directivity of the smart antenna is varied to search for a receiving direction of the smart antenna in which the signal state is good. Consequently, the image quality is stable in television broadcasting.

According to another preferable configuration, the auto-scan unit changes receiving channels of the tuner section as appropriate by making the directivity control section change the smart antenna directivity to different directions and making the signal condition detector section detect a signal state in each direction.

In this configuration, it is possible to search, on each receiving channel, for a receiving direction of the smart antenna in which the signal state is good.

According to another preferable configuration, the auto-scan unit changes receiving channels upon storage of a receiving channel in the channel storing section.

In this configuration, the auto-scan unit changes receiving channels upon storage of a receiving channel in the channel storing section. In other words, the auto-scan unit makes the signal condition detector section detect a signal state in each direction on one receiving channel and when the detected signal state is a predetermined one, no further signal state detection is made on the same channel and the channel is changed to a next receiving channel. Consequently, the speed of auto-scan processing is further increased.

According to another preferable configuration, the signal condition detector section is an AGC circuit which detects AGC voltage which determines the gain of a signal from the tuner section.

In this configuration, it is possible to store a receiving direction in which an intermediate frequency signal from the tuner section is good.

According to another preferable configuration, the signal condition detector section is a demodulator circuit which detects the bit error rate of a digital signal from the tuner section.

In this configuration, it is possible to store a receiving direction in which the bit error rate of a signal from the tuner section is low.

In the afore-mentioned preferred aspects and configurations, the television may be equipped with constituent parts and units of the television tuner. In other words, the invention may be applied to a television with a tuner function.

BRIEF DESCRIPTION OF THE DRAWINGS

The invention will be more particularly described with reference to the accompanying drawings, in which:

FIG. 5 is a table showing an example of channel select data;

DETAILED DESCRIPTION OF THE PREFERRED EMBODIMENTS

Figure 1:
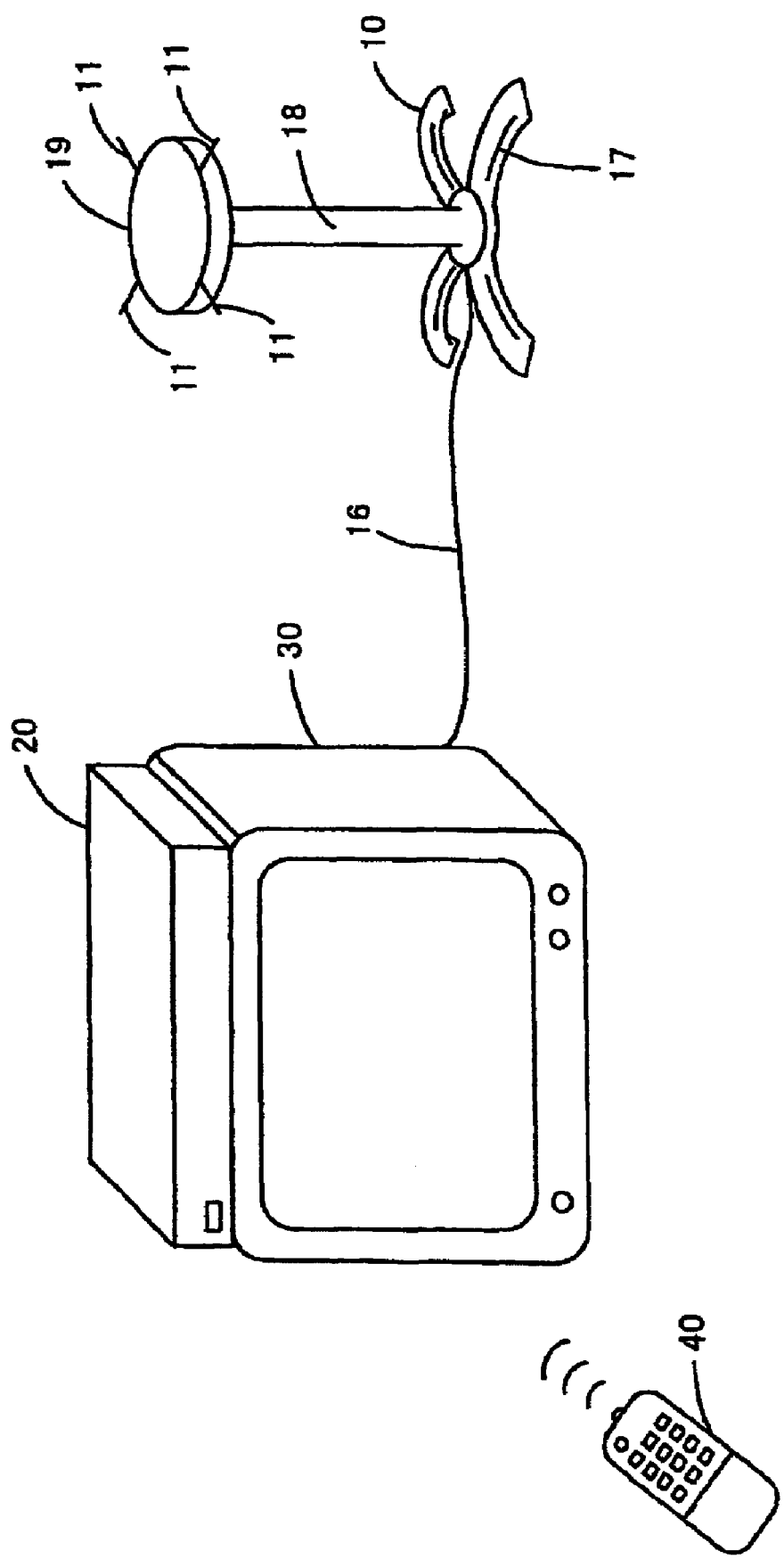
FIG. 1 is a block diagram showing a television receiver system configuration.

FIG. 1 roughly shows the configuration of a television receiver system equipped with a television tuner according to the present invention. As shown in the figure, a television 30 is equipped with an almost rectangular box type television tuner 20 connected with the television 30 via a cable (not shown). The television tuner 20 is a so-called set-top box and can be installed in any place so long as it can be connected with the television 30. The television tuner 20 is connected with an antenna cable 16, which is used to connect the television tuner 20 with a smart antenna unit 10.

The smart antenna unit 10 has foot 17 at its bottom to keep it stable. An almost cylindrical pole 18 is standing in an almost upright position from the foot 17. An antenna holder 19, platy and almost circular as seen from above, rests on the upper end of the pole 18. The antenna holder 19 is almost horizontal and four bar directional antennas 11 protrude from the side of the holder 19 radially. The angle between neighboring directional antennas 11 is 90 degrees, which means that the directional antennas 11 are evenly spaced in the circumferential direction on the side face of the antenna holder 19. The directional antennas 11 are each extendable so that the user can draw it to extend it. The directivity of the antenna unit 10 is controlled in all directions by shifting the phase of specific ones among the radio waves which are received by these directional antennas 11. When terrestrial television waves are transmitted from a direction, the directivity of the smart antenna unit 10 can be adjusted to that direction. This makes it possible to receive television waves from a larger number of broadcasters and enable the user to enjoy programs on a larger number of channels.

Figure 2:
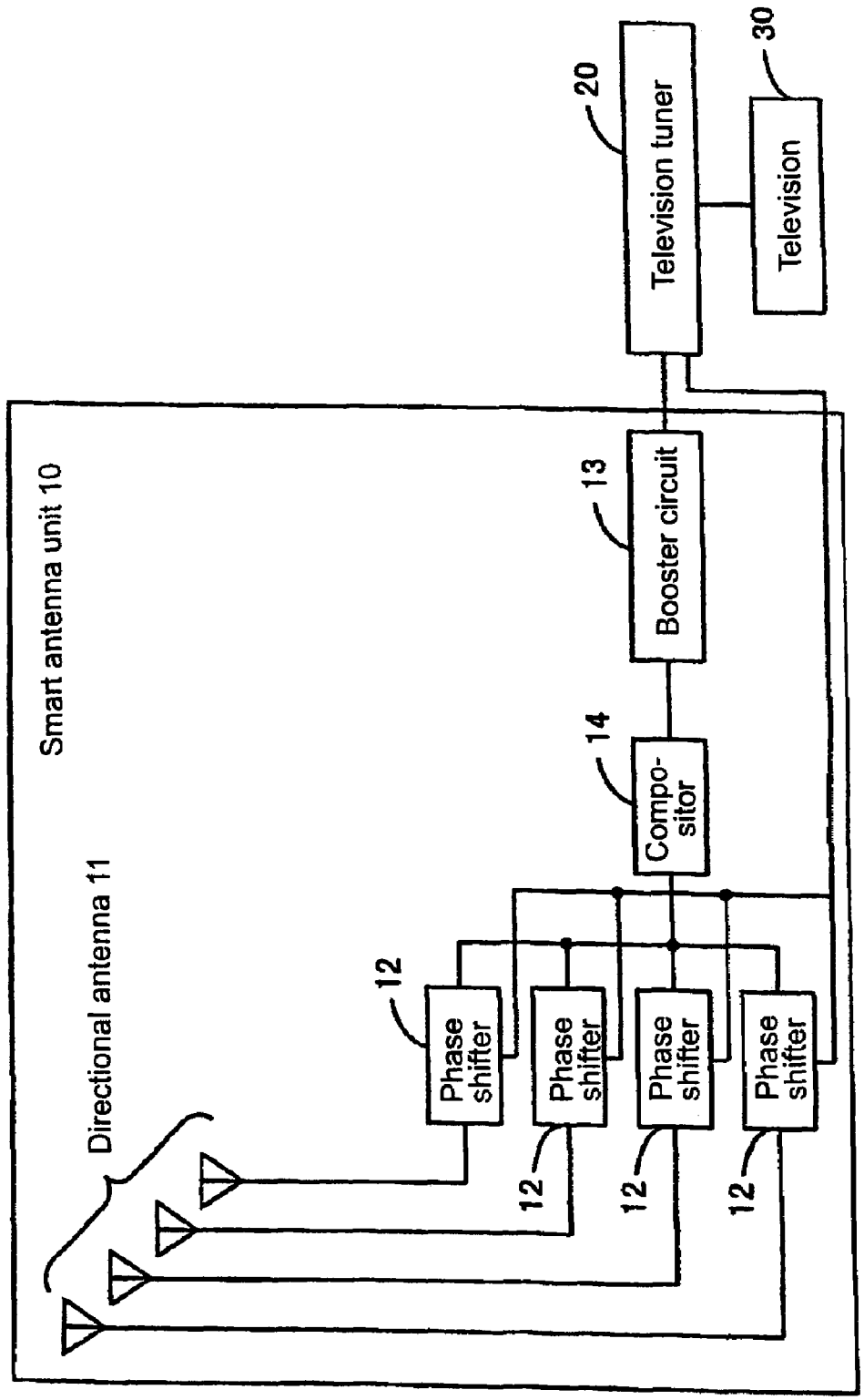
FIG. 2 is a block diagram showing the internal structure of a smart antenna unit.

FIG. 2 conceptually illustrates the internal structure of the smart antenna unit 10. As shown in the figure, the four directional antennas 11 are respectively connected with four phase shifters 12 by four different wires. The phase shifters 12 are circuits which control the phase of a signal coming from the directional antennas 11 by delaying the phase according to bias voltage outputted from the television tuner 20. The signals whose phase has been controlled by the phase shifters 12 enter a compositor 14 where they are combined. The combined signal from the compositor 14 enters a booster circuit 13 where it is amplified.

In this way, signals received by the four directional antennas 11 are phase-shifted and combined, so that the four directional antennas 11 are directed not only to their axial direction but also to a desired direction. In other words, a main beam generated by the smart antenna unit 10 is directed to a desired direction by setting the phase of each phase shifter 12 to an adequate value.

Figure 3:
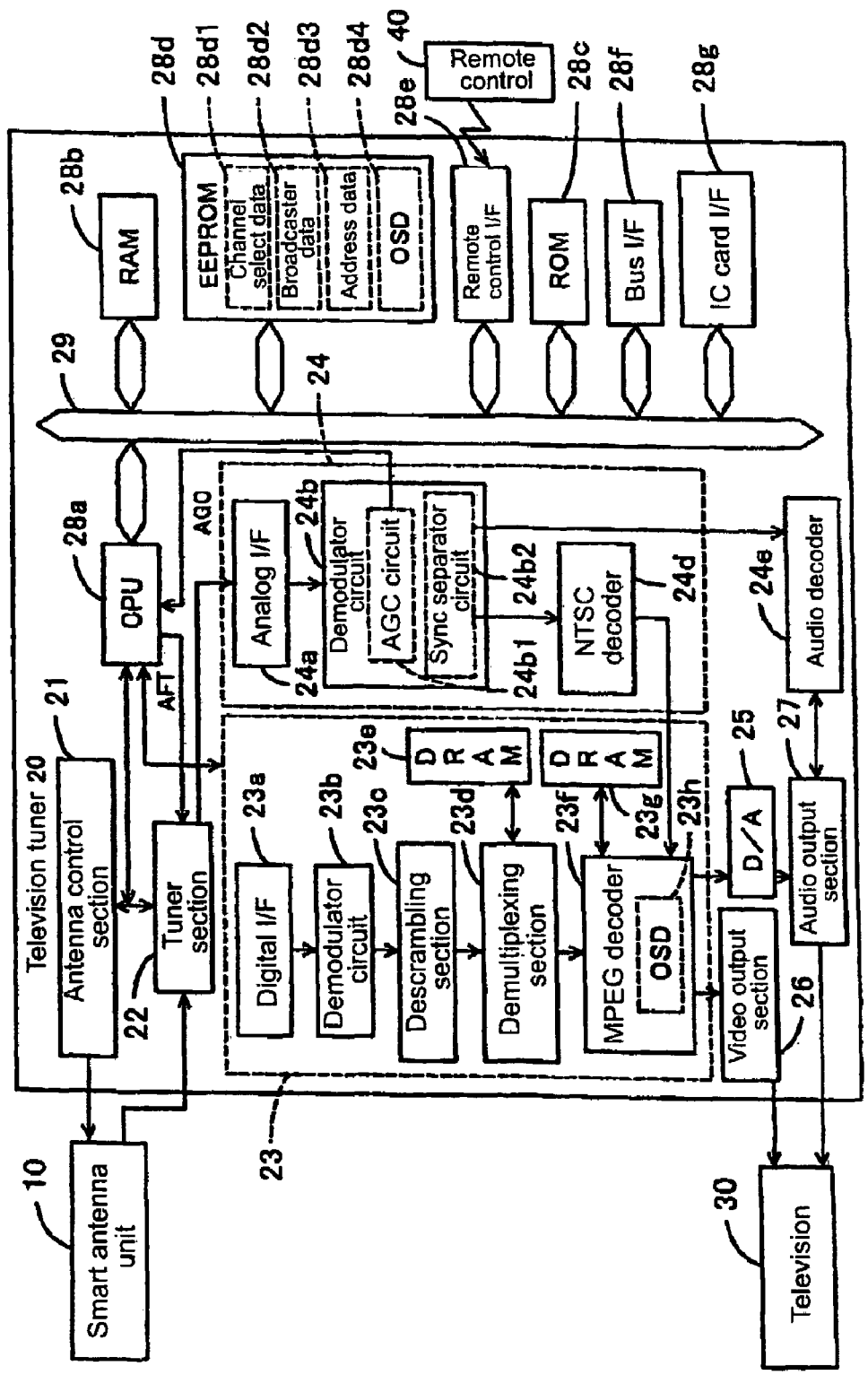
FIG. 3 is a block diagram showing the internal structure of a television tuner.

FIG. 3 conceptually illustrates the internal structure of the television tuner 20. As shown in the figure, the television tuner 20 has an antenna control section 21 for controlling the phase of the phase shifters 12 of the smart antenna unit 10, and a tuner section 22 for receiving a frequency signal from the smart antenna unit 10. The television tuner 20 generates a signal for controlling the antenna directivity of the smart antenna unit 10 according to a command from a CPU 28a. Concretely, the bias voltage supplied to each phase shifter 10 is varied to change the receiving direction of the smart antenna unit 10. The television tuner 20 has a ROM (not shown) to store a bias voltage combination to be supplied to each phase shifter 12. Sixteen bias voltage combination patterns are stored and the television tuner 20 outputs one of these patterns according to a command from the CPU 28a.

Figure 4:
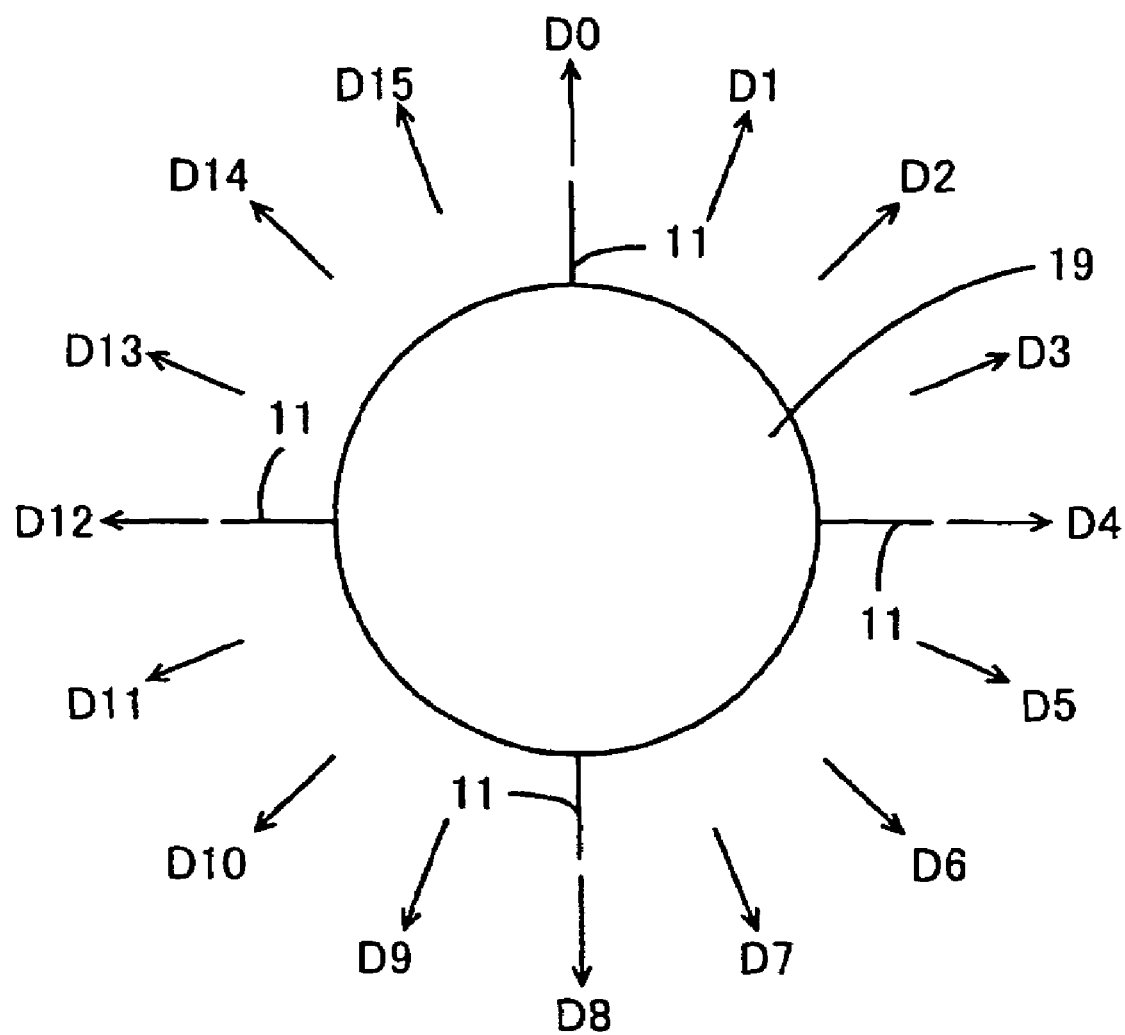
FIG. 4 is a conceptual diagram showing the directivity of a smart antenna unit.

This means that the smart antenna unit 10 offers 16 different receiving directions. FIG. 4 shows the 16 receiving directions. As shown in the figure, 16 different receiving directions are arranged radially around the antenna holder 19 and evenly spaced. The angle difference between neighboring receiving directions is uniform (360/16=22.5 degrees). When the receiving directions are evenly spaced around the antenna holder 19 like this, the directivity can be adjusted to follow incoming television waves from any direction. The 16 receiving directions are consecutively numbered clockwise in a way that the receiving direction at the top in the figure is identified as D0, and the others as D1, D2 and so on up to D15.

The tuner section 22 (FIG. 3) is a so-called synthesizer tuner and given PLL data as a channel select control signal, namely dividing ratio data of a variable dividing circuit in the PLL loop. Also in the tuner section 22, PLL data as a channel select control signal is received from the CPU 28a and a corresponding frequency band signal is extracted from received frequency signals to select one of plural receiving channels. The CPU 28a detects a frequency difference in the tuner section 22 and supplies AFT voltage to the tuner section 22 based on the result of detection. The tuner section 22 adjusts the extracted frequency band according to the AFT voltage to optimize channel selection.

Output of the tuner section 22 is supplied to a digital reproduction section 23 or analog reproduction section 24. This means that the television tuner 20 according to this embodiment can reproduce both digital and analog broadcasting signals. The digital reproduction section 23 consists of a digital I/F 23a, a demodulator circuit 23b, a descrambling section 23c, a demultiplexing section 23d, and an MPEG decoder 23g. The digital I/F 23a, which receives frequency signals from the tuner section 22, is equipped with an A/D converter. The demodulator circuit, which receives signals from the digital I/F 23a, is equipped with a channel equalizer, an error correction decoder, etc.

The digital I/F 23a and the demodulator circuit 23b convert frequency signals received from the tuner section 22 into digital signals and perform so-called ghost cancellation on the resulting digital signals according to control data from the CPU 28a. In addition, the digital I/F 23a and the demodulator circuit 23b correct bit errors which have occurred on the transmission line and obtain a transport stream (TS) as an output. In the above process, the demodulator circuit 23b detects the ratio of bit errors to the whole data as a bit error rate.

The transport stream obtained as a result of demodulation and error correction in the demodulator circuit 23b is sent to the descrambling section 23c. Since the transport stream is usually a scrambled stream, it cannot be used as it is to reproduce video and audio signals properly. For this reason, the descrambling section 23c descrambles the transport stream to make it a reproducible data array. The descrambled transport stream, which is a multiplexed data array including vide and audio signals and text data, is sent to the demultiplexing section 23d. The demultiplexing section 23d demultiplexes the received data; namely the data is demultiplexed here. The descrambling section 23c and the demultiplexing section 23d can use DRAM 23e as a work area.

The demultiplexed data is divided into MPEG data (video and audio signals compressed in a prescribed manner) and data other than video and audio signals (for example, text data related to TV programs) and the latter data is sent to the CPU 28a. On the other hand, the former data, MPEG data, is sent to the MPEG decoder 23f where it is decompressed or decoded. As the MPEG data is decoded, a digital video signal and a digital audio signal are generated and the digital video signal is converted into an analog video signal.

The MPEG decoder 23f has an OSD processing section 23h which can display a still image over a video image or replace a given still image. The OSD processing section 23h can receive text data, etc from the CPU 28a and generate still images based on the text data, etc.

The MPEG decoder 23f can use DRAM 23g as a work area for MPEG decoding or OSD processing. In other words, the MPEG decoder 23f can perform decompression, and also, through its OSD processing section 23h, perform graphic processing. The decompressed analog image signal is sent to a vide output section 26 where the image signal is sent to the television 30. For sending analog signals to the television 30, composite output, S-video output and other various methods are available.

On the other hand, the audio signal generated by MPEG decoding enters a D/A converter 25 where it is converted into an analog audio signal. This analog audio signal enters an audio output section 27 from which it is sent to the television 30. If the television 30 has an optical input terminal or the like and can receive a digital audio signal, the digital audio signal may be sent to the television 30 without being converted into an analog signal by the D/A converter 25.

The analog reproduction section 24 consists of an analog I/F 24a, a demodulator circuit 24b, an NTSC decoder 24d and an audio decoder 24e. The analog I/F 24a and demodulator circuit 24b1 have an AGC circuit 24b1 which amplifies intermediate frequency signals coming from the tuner section 22. The gain of an intermediate frequency signal in the AGC circuit 24b1 is determined by AGC voltage which varies depending on the amplitude of the intermediate frequency signal amplified in the AGC circuit 24b1. In other words, the AGC circuit 24b1 amplifies an intermediate frequency signal using AGC voltage as a feedback signal.

Specifically, when the amplified intermediate frequency signal is strong, the AGC voltage is lowered to decrease the gain; and when the amplified intermediate frequency signal is weak, the AGC voltage is raised to increase the gain. This means that in this embodiment, the higher the AGC voltage is, the weaker the intermediate frequency signal from the tuner section 22 is. Since the amplitude of the amplified intermediate frequency signal is thus kept almost constant, reproduced color is not different among channels. In addition, an AGC voltage is generated by comparison of an amplified intermediate frequency signal with a prescribed reference voltage and the amplitude of the amplified intermediate frequency signal is kept at an ideal level. The AGC voltage is sent to the CPU 28a so that the CPU 28a performs various control tasks according to the received AGC voltage.

The demodulator circuit 24b divides the demodulated intermediate frequency signal to generate an analog video signal in NTSC format and an analog audio signal. The generated analog video signal enters the NTSC decoder 24d where it is converted into a digital video signal in CCIR656 format. The NTSC format is standard for analog television signals and includes a signal for color reproduction, a horizontal sync signal (15.75 kHz) and a vertical sync signal (60 Hz). The demodulator circuit 24b has a sync separator circuit 24b2 to extract a horizontal sync signal and a vertical sync signal so that the NTSC decoder 24d can generate digital video signals synchronously according to the horizontal and vertical sync signals extracted by the sync separator circuit 24b2. The CCIR656 format is a digital audio signal format which digitally reproduces tones of Y, U, and V components. The analog audio signal generated by the demodulator circuit 24b is sent to the audio decoder 24e where it is divided into independent left and right stereophonic sound signals.

The digital video signal generated in the NTSC decoder 24d enters the MPEG decoder 23f where it is processed for OSD and converted into an analog signal as mentioned above. The resulting analog video signal is sent to the video output section 26 from which it is sent to the television 30. On the other hand, the audio signal enters an audio output section 27 from which it is sent to the television 30.

The CPU 28a, which is connected with a bus 29, performs control tasks to perform various functions of the television tuner 20 using the RAM 28b as its work area connected with the bus 29. A program which executes these control tasks is previously stored in a ROM 28c and the CPU 28a loads the program from the ROM 28c into the RAM 28b as appropriate to perform control tasks. The bus 29 is equipped with a rewritable EEPROM 28d. The CPU 28a uses various types of data stored in the EEPROM 28d to perform control tasks.

One example of data stored in the EEPROM 28d is channel select data 28d1. FIG. 5 shows one example of channel select data 28d1. Channel select data 28d1 is a table which correlates receiving channel numbers selectable with a remote control 40, etc. to frequency bands which are extracted by the tuner section 22. The CPU 28a refers to the table to identify the frequency band corresponding to the selected channel number. In this embodiment, the tuner section 22 is of the synthesizer type where the relation between channel number and dividing ratio data is stored as channel select data 28d1.

If no channel select data 28d1 is stored in the EEPROM 28d, it is necessary to store channel select data 28d1 in the EEPROM 28d by giving a channel selection command thorough the remote control 40 or the like. As a command is given to store channel select data 28d1, an auto-scan processing is done to create channel select data 28d1. In this auto-scan processing, a signal state in each direction is automatically detected and each time when detections in all directions are made, the channel number is switched to a next one. When the detected signal state becomes a predetermined signal state, the corresponding channel number is stored in the EEPROM 28d. Unless the detected signal state is not the predetermined signal state, the channel number is not stored. Another possible approach is to arrange that when no channel select data 28d1 is stored, auto-scan processing is automatically done and even when channel select data 28d1 is stored, auto-scan processing is done according to a command given through the remote control 40 or the like to update the channel select data 28d1.

The EEPROM 28d stores OSD data 28d4 to create an OSD image in the OSD processing section 23h. The CPU 28a loads OSD data 28d4 as appropriate according to a command from the remote control 40 or operational conditions of various circuits and sends OSD data 28d4 to the OSD processing section 23h. For example, if the CPU 28a decides that a warning should be given to the user, it loads OSD data 28d4 which enables generation of a warning display and instructs the OSD processing section 23h to make the video include a warning display.

The bus 29 is connected with a remote control I/F 28e so that an infrared blinker signal from the remote control 40 as an external device can be received. This infrared blinker signal is sent through the bus 29 to the CPU 28a which then performs a control task appropriate to the signal. The bus 29 is also connected with a bus I/F 28f for connection with an external device via a cable, and an IC card I/F 28g for data exchange with an IC card. Data read from the bus I/F 28f and IC card I/F 28g is sent thorough the bus 29 to the CPU 28a which then performs processing as required.

Figure 6:
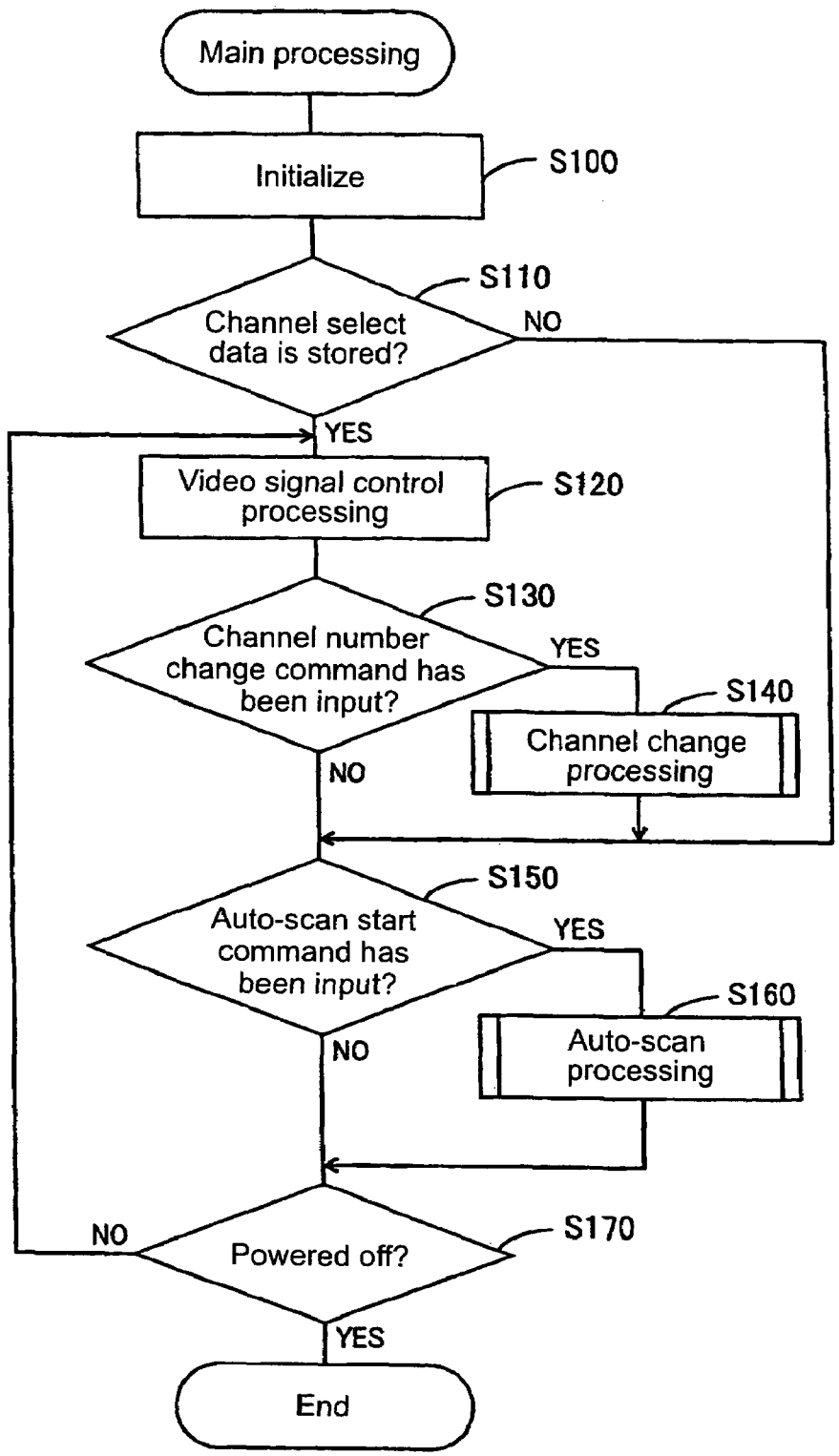
FIG. 6 is a flowchart showing a main processing sequence.

Next, the sequence of main processing which the television tuner 20 as shown in FIGS. 1 and 3 performs will be explained referring to the flowchart of FIG. 6. First, at step S100, initialization is done by performing necessary operations for initialization such as clearing the register in the CPU 28a and the RAM 28b and reading white balance calibration setup data from the EEPROM 28d.

At step S110, a decision is made as to whether or not channel select data 28d1 is stored in the EEPROM 28d. If channel select data 28d1 is stored in the EEPROM 28d, video signal control processing is performed at step S120. In this process, the CPU 28a plays a leading role in controlling the components and circuits of the television tuner 20 according to the current channel number stored in the EEPROM 28d to display television images corresponding to that channel number on the television 30.

Next, at step S130, a decision is made as to whether a channel number change command has been given. Namely, whether a command to change channel numbers has been given by operation of the remote control 40, etc is checked. If a channel number change command has been given, channel change processing is performed at step S140. Here, the directivity of the smart antenna unit 10 is adjusted. Channel change processing will be explained later in more detail in reference to FIG. 8.

After processing at step S140 is over or when it is decided at step S130 that no channel number change command has been given, at step S150 a decision is made as to whether an auto-scan start command has been given by menu selection through the remote control 40. If an auto-scan start command has been given, auto-scan processing is performed at step S160. Auto-scan processing will be explained later in more detail in reference to FIG. 7.

After processing at step S160 is over or when it is decided at step S150 that no auto-scan start command has been given, at step S170 a decision is made as to whether a command to turn off the television tuner 20 has been given. If no command to turn off the television tuner 20 has been given, the sequence goes back to step S120; if a command to turn it off has been given, the main processing sequence is ended.

Next, the sequence of auto-scan processing which is executed at step S160 in the flowchart of FIG. 6 will be explained in reference to FIG. 7. First, at step S200, channel number α is set to "2" (α=2). Also at step S200, PLL data corresponding to the set channel number is given to the tuner section 22.

At step S210, receiving direction pattern D is set to 0 (D=0). Also at step S210, bias voltage corresponding to the set receiving direction pattern (D=0) is supplied to the four phase shifters 12. The directivity of the smart antenna 10 is thus set.

Next, at step 220, signal state detection is made. If the frequency signal from the tuner section 22 is a digital frequency signal, the signal state is detected by bit error rate detection by the digital I/F 23a and the demodulator circuit 23b. If the frequency signal from the tuner section 22 is an analog frequency signal, the signal state is detected based on AGC voltage sent from the AGC circuit 24b1 to the CPU 28a.

Next, at step 230, a decision is made as to whether the detected signal state is a predetermined one. The ROM 28 or the like in the television tuner 20 stores reference data for checking a signal state (bit error rate and AGC voltage data) and at step S230, the detected signal state is checked based on this data.

At step S230, if it is decided that the detected signal state is a predetermined one, the channel number is stored at step S240. In this process, the channel number set at step S200 or step S280 (stated later) is stored in the EEPROM 28d.

After processing at step S240 is over or when it is decided at step S230 that the detected signal state is not a predetermined one, at step S250 a decision is made as to whether the receiving direction pattern D is smaller than 15 (D<15) If D<15, the receiving direction pattern value (D) is updated to D+1 (D=D+1) and then the sequence goes back to step S220.

On the other hand, if it is decided at step S250 that receiving direction pattern D is not smaller than 15 (namely D=15), at step S270 a decision is made as to whether channel number α is smaller than 69 (α<69). If α<69, the channel number (α) is updated to α+1 (α=α+1) and then the sequence goes back to step S210. If α is not smaller than 69 (namely α=69), auto-scan processing is ended.

Next, a concrete example of auto-scan processing (FIG. 7) will be explained in reference to FIG. 5. Here it is assumed that on channel number α=2, the signal state is good in receiving direction pattern D=1. First, channel number α is set to 2 (α=2) (step S200); then receiving direction pattern D is set to 0 (D=0) (step S210). In this receiving direction pattern, the signal state is detected (step S220); then the detected signal state is checked (step S230). As described above, on channel number α=2 the signal state is good in receiving direction pattern D=1. Therefore, in this case it is decided that the detected signal state is not a predetermined one and the channel number is not stored.

After the signal sate is detected and checked in receiving direction pattern D=0, receiving direction pattern D is set to 1 (D=1) (step S260) and the signal state in this receiving direction pattern is detected (step S220). Since the signal state in this receiving direction pattern is good as described above, the channel number (α=2) is stored in the EEPROM 28d (step S240). Then, detection and check of signal states in the other receiving direction patterns are made one after another. After signal state detection and check in receiving direction pattern D=15 are over, the channel number increases by one, namely α=3 (step S280). On channel number 3, receiving direction patterns D are set to 0-15 and the signal state in each receiving direction pattern is detected and checked. As suggested in FIG. 5, since, on channel number 3 (α=3), there is no receiving direction pattern in which the signal state is good, this channel number and any receiving direction pattern for it are not stored.

Hence, the process of creating channel select data 28d1 in this television tuner 20 is summarized as follows. A channel number is fixed and the receiving direction pattern is varied from 0 to 15 (D=0-15) one after another and the signal state of a frequency signal from the tuner section 22 in each of these receiving direction patterns is detected and checked. After signal state detection in D=15 is over, or detection in all directions is over, the channel number is changed to a next one. When the signal state is a predetermined one on a channel number, that channel number is stored in the EEPROM 28d and this process is repeated sequentially to create channel select data 28d1.

Figure 8:
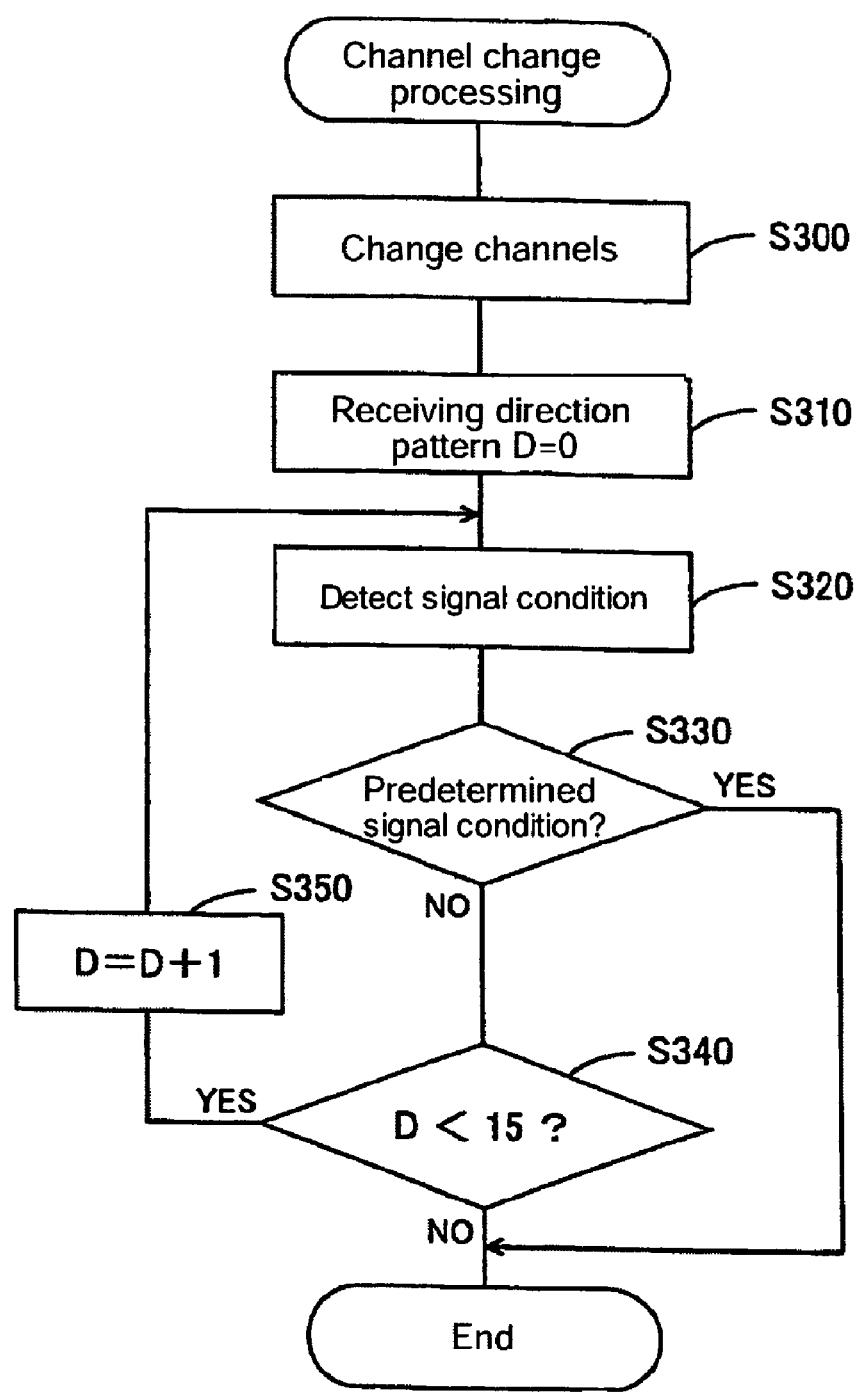
FIG. 8 is a flowchart showing a channel change processing sequence which is executed at step S140 in the flowchart of FIG. 6.

Next, the sequence of channel change processing which is executed at step S140 in the flowchart of FIG. 6 will be explained in reference to FIG. 8. First, at step S300, the channel on which signals are received is changed in the tuner section 22. In this process, PLL data corresponding to the newly selected channel number is given to the tuner section 22 to change receiving channels.

At step S310, receiving direction pattern D is set to 0 (D=0). Also at step S310, bias voltage corresponding to the set receiving direction pattern (D=0) is supplied to the four phase shifters 12. Next, at step S320, signal state detection is made. Step 320 is the same as abovementioned step S220.

Next, at step 230, a decision is made as to whether the detected signal state is a predetermined one. Step 330 is the same as abovementioned step S230. At step S330, when the detected signal state is a predetermined one, channel change processing is ended. This means that at step S330, the receiving direction in which the signal state is decided to be a predetermined one is retained.

On the other hand, it is decided at step S330 that the detected signal state is not a predetermined one, at step S340 a decision is made as to whether receiving direction pattern D is smaller than 15 (D<15) If D<15, the receiving direction pattern value (D) is updated to D+1 (D=D+1) and then the sequence goes back to step S320. On the other hand, if it is decided at step S330 that the detected signal state is not a predetermined one, channel change processing is ended.

Next, a concrete example of channel change processing (FIG. 8) will be explained. Here it is assumed that a command to change the channel number to "2" is given by operation of the remote control 40 and on that channel number the state of the signal from the tuner section 22 is good in receiving direction pattern D=1. First, PLL data corresponding to the channel number α is given to the tuner section 22 to change channels (step S300). Then, receiving direction pattern D is set to 0 (D=0) (step S310). In this receiving direction pattern, the signal state is detected (step S320); then the detected signal state is checked (step S330). As described above, on channel number α=2, the signal state is good in receiving direction pattern D=1. Therefore, in this case it is decided that the detected signal state is not a predetermined one.

After the signal sate is detected and checked in receiving direction pattern D=0, receiving direction pattern D is set to 1 (D=1) (step S350) and the signal state in this receiving direction pattern is detected (step S320). Since the signal state in this receiving direction pattern is good as described above, that receiving direction is retained.

Figure 7:
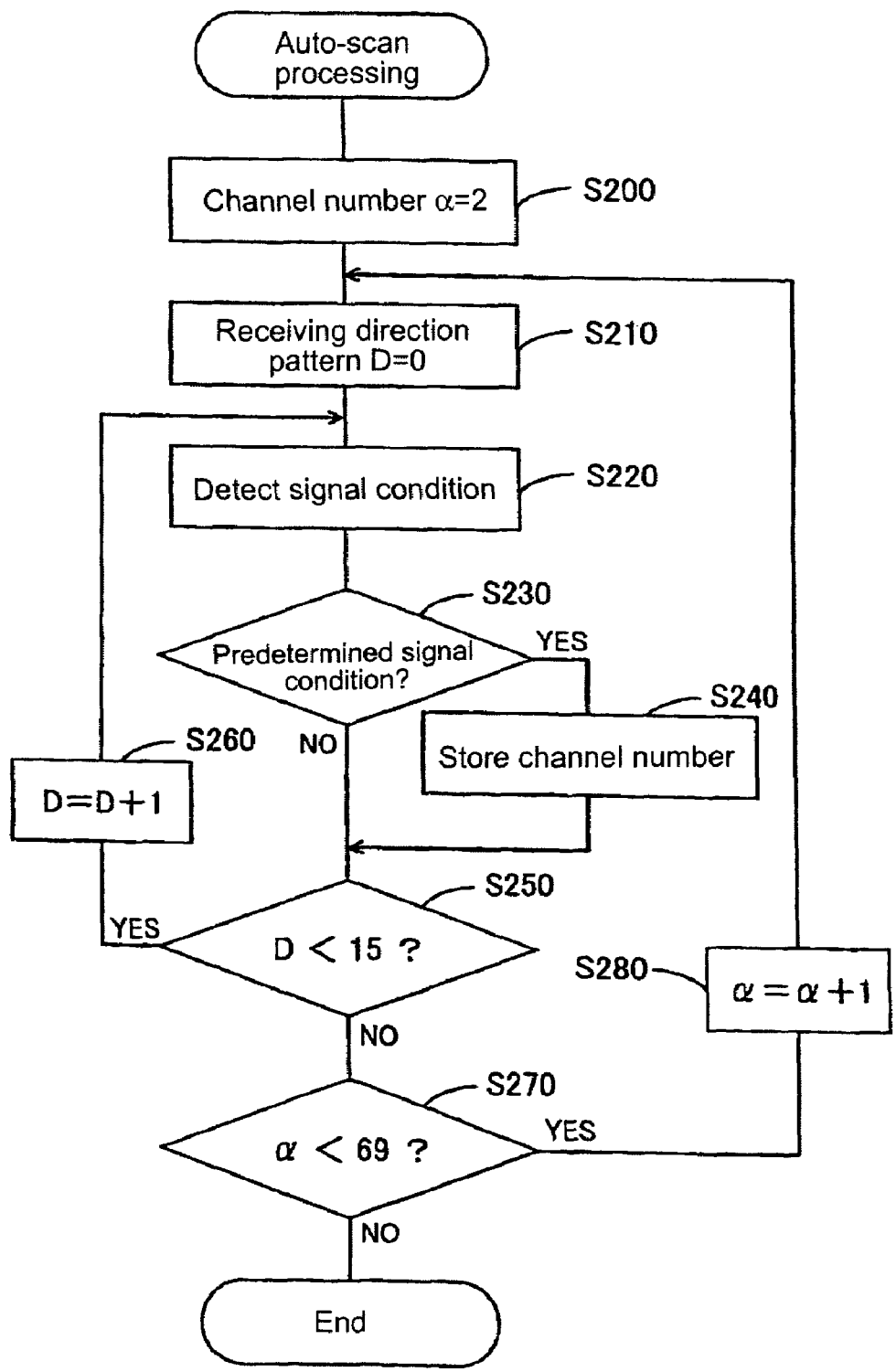
FIG. 7 is a flowchart showing an auto-scan processing sequence which is executed at step S160 in the flowchart of FIG. 6.

In the sequence shown in FIG. 7, regardless whether a channel number on which the detected signal state is a predetermined one is stored in the EEPROM 28*d* or not, receiving direction pattern D is varied from 0 to 15 one after another and signal state detection in all receiving directions is made before changing channel numbers. Another possible sequence is that the television tuner 20 is designed to change channel numbers after a channel on which the detected signal state becomes a predetermined one is stored in the EEPROM 28*d*.

Figure 9:
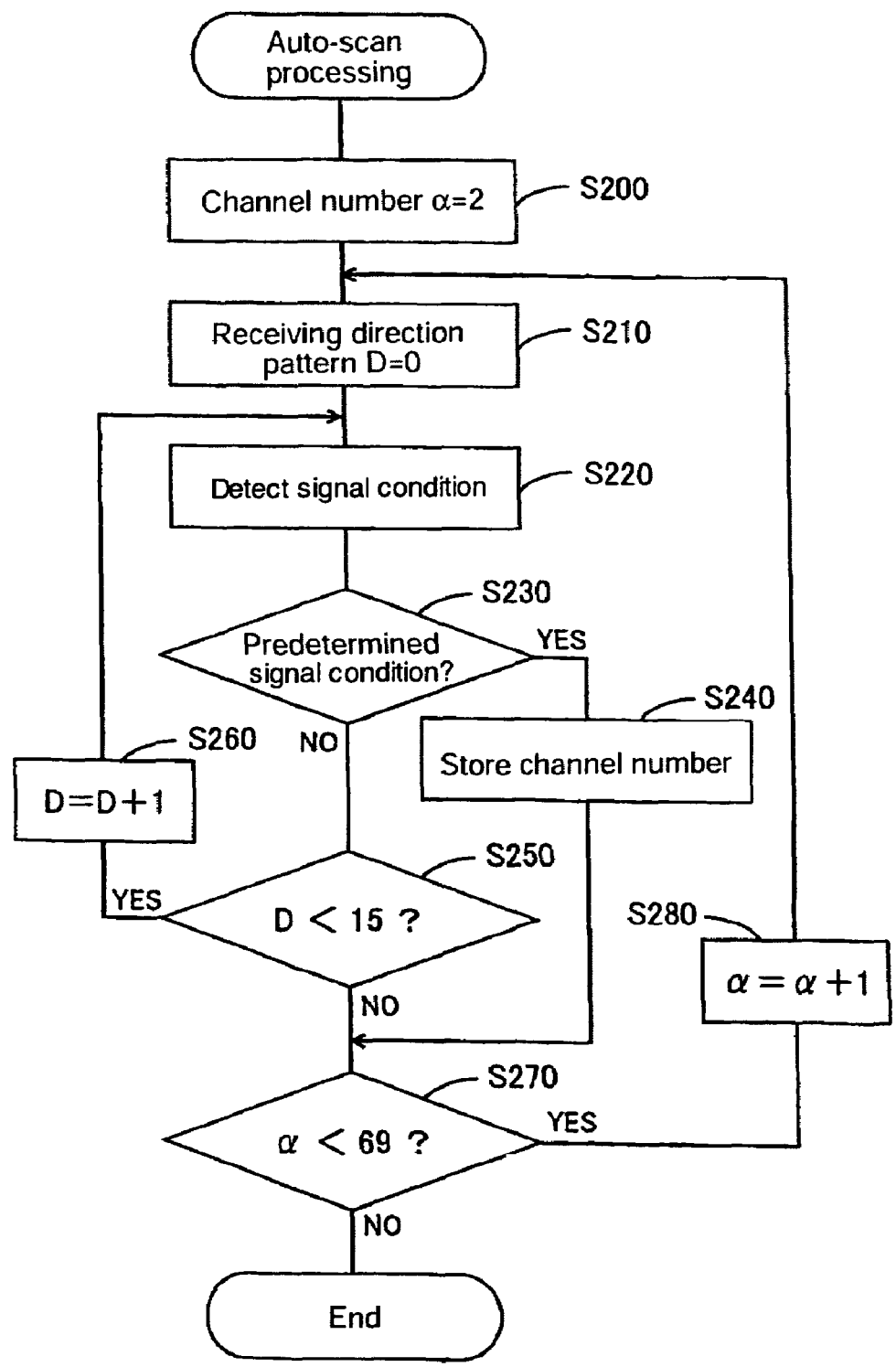
FIG. 9 is a flowchart showing another auto-scan processing sequence.

Next, another example of an auto-scan processing sequence which is performed in the television tuner 20 will be explained in reference to the flowchart of FIG. 9. As shown in FIG. 9, after step S240 is carried out, the sequence goes to step S270. After the channel number is stored in the EEPROM 28*d*, the channel number is changed to a next one without changing receiving direction patterns further. This increases the speed of setting the antenna directivity for each channel number.

Next, a concrete example of auto-scan processing (FIG. 9) will be explained in reference to FIG. 5. Here it is assumed that on channel number α=2, the signal state is good in receiving direction pattern D=1. First, channel number α is set to 2 (α=2) (step S200); then receiving direction pattern D is set to 0 (D=0) (step S210). In this receiving direction pattern, the signal state is detected (step S220); then the detected signal state is checked (step S230). As described above, on channel number α=2, the signal state is good in receiving direction pattern D=1. Therefore, in this case it is decided that the detected signal state is not a predetermined one, and the channel number is not stored.

After the signal state is detected and checked in receiving direction pattern D=0, receiving direction pattern D is set to 1 (D=1) (step S260) and the signal state in this receiving direction pattern is detected (step S220). Since the signal state in this receiving direction pattern is good as described above, the channel number (α=2) is stored in the EEPROM 28*d* (step S240). Then, without detection and check of signal states in the subsequent receiving direction patterns (D=2-15), the channel number increases by one, namely α=3 (step S280). On channel number 3, receiving direction patterns D are set to 0-15 one after another and the signal state in each receiving direction pattern is detected and checked. As suggested in FIG. 5, since on channel number 3 (α=3) there is no receiving direction pattern in which the signal state is good, this channel number is not stored. In this way, in the auto-scan processing sequence shown in FIG. 9, if on a channel number the detected signal state becomes a predetermined one, no detection and check are made in the subsequent receiving patterns and the channel number is changed to a next one.

As explained so far, according to the present invention, only the number of a channel on which the state of a received signal is good is stored and the corresponding receiving direction of the smart antenna is not stored. Consequently, the speed of auto-scan processing is increased.

The foregoing invention has been described in terms of preferred embodiments. However, those skilled, in the art will recognize that many variations of such embodiments exist. Such variations are intended to be within the scope of the present invention and the appended claims.

What is claimed is:

1. A television tuner for receiving television signals using an antenna having directivity selected by an electrical signal, comprising:

a directivity control section that outputs an electrical signal to select the directivity of the antenna, the directivity control section includes:

plurality of directional antennas coupled with a plurality of phase shifter circuits, with a phase shifter circuit of the plurality of phase shifter circuits controlling a phase shift amount of a signal input from a directional antenna of the plurality of directional antennas and delaying a phase of the signal according to a bias voltage output from the television tuner to control the directivity of the directional antenna for any direction, including an axial direction of the directional antenna and for generating a directivity value;

a tuner section that receives television signals in a given frequency band using the antenna and outputs an intermediate frequency (I/F) signal;

a signal condition detector section that detects a signal condition of the I/F signal, with the signal condition based on a channel number of a channel and directivity value;

if a frequency signal of the I/F signal is a digital frequency signal, the signal condition is determined by detecting a bit error rate; if the frequency signal of the I/F signal is an analog signal, the signal condition is determined by detecting an AGC voltage output;

a channel storing section that stores the channel number of the channel and the directivity value of the directional antenna as a channel select data if the signal condition of the I/F signal is commensurate with a predetermined signal condition;

if it is determined that the channel select data is stored, a video signal control processing is executed to display an image, after which, it is determined if a channel number change command is input;

if it is determined that a channel number change command is input, a channel change processing is executed, otherwise, if it is determined that a channel number change command is not input, it is determined if auto-scan start command is input;

if it is determined that the auto-scan start command is input, the auto scan processing is executed;

the change channel processing includes:

the tuner section receiving data corresponding to a newly selected channel number;

the directivity value of the antenna is set to a first directivity value using phase shifter circuits;

the signal condition detector section detects a new signal condition of a new I/F signal, with the new signal condition based on the newly selected channel number and the set directivity value;

determining if the detected signal condition is commensurate with a predetermined signal condition;

if the detected signal condition is not commensurate with the predetermined signal condition, determining if the set directivity value is less than a predetermined directivity value; if it is determined that the set directivity value is less than a predetermined directivity value, incrementing the directivity value and detecting the signal condition based on the incremented directivity value and the new channel number.

2. The television tuner for receiving television signals using an antenna having directivity selected by an electrical signal as set forth in claim 1, wherein:

the auto-scan processing includes:

the tuner section receiving data that corresponds with a first channel number for setting the channel to the first channel number;

the directivity value of the antenna is set to a first directivity value using phase shifter circuits;

the signal condition detector section detecting the signal condition of the I/F signal output form the television tuner based on the set channel number and the directivity value;

determining if the detected signal condition is commensurate with a predetermined signal condition;

if the detected signal condition is commensurate with the predetermined signal condition, the channel storing section stores the set channel number as the channel select data;

determining if the set directivity value is less than a predetermined directivity value; if it is determined that the set directivity value is less than a predetermined directivity value, incrementing the directivity value and detecting the signal condition based on the incremented directivity value and the set channel number; otherwise, if it is determined that the set directivity value is not less than a predetermined directivity value, then determining if the set channel number is less than a predetermined channel number; if so, incrementing the set channel to a higher channel number, resetting the directivity value, and detecting the signal condition based on a newly set channel number and the reset directivity value.

3. The television tuner for receiving television signals using an antenna having directivity selected by an electrical signal as set forth in claim 1, wherein:

the auto-scan processing includes:

the tuner section receiving data that corresponds with a first channel number for setting the channel to the first channel number;

the directivity value of the antenna is set to a first directivity value using phase shifter circuits;

the signal condition detector section detecting the signal condition of the I/F signal output form the television tuner based on the set channel number and the directivity value;

determining if the detected signal condition is commensurate with a predetermined signal condition;

if the detected signal condition is commensurate with the predetermined signal condition, the channel storing section stores the set channel number, and determining if the set channel number is less than a predetermined channel number; if so, incrementing the set channel to a higher channel number, resetting the directivity value, and detecting the signal condition based on a newly set channel number and the reset directivity value;

if the detected signal condition is not commensurate with the predetermined signal condition, determining if the set directivity value is less than a predetermined directivity value; if it is determined that the set directivity value is less than a predetermined directivity value, incrementing the directivity value and detecting the signal condition based on the incremented directivity value and the set channel number; otherwise, if it is determined that the set directivity value is not less than a predetermined directivity value, then determining if the set channel number is less than a predetermined channel number; if so, incrementing the set channel to a higher channel number, resetting the directivity value, and detecting the signal condition based on a newly set channel number and the reset directivity value.

* * * * *